United States Patent Office 3,479,309
Patented Nov. 18, 1969

3,479,309
FATTY ACID-POLYVALENT METAL SALT STABILIZERS FOR POLYVINYL CHLORIDE RESINS WITH REDUCED TENDENCY TO FORM BLOOM
Arthur C. Hecker, Forest Hills, and Alfred Thee, Long Beach, N.Y., assignors to Argus Chemical Corporation, Brooklyn, N.Y., a corporation of Delaware
No Drawing. Filed Sept. 11, 1967, Ser. No. 666,920
Int. Cl. C08f *45/36, 29/18;* C08k *1/66*
U.S. Cl. 260—23               20 Claims

ABSTRACT OF THE DISCLOSURE

A polyvinyl chloride resin stabilizer lubricant composition is provided, consisting essentially of a fatty acid or fatty acid ester lubricant and a polyvalent metal salt of a naturally occurring saturated aliphatic fatty monocarboxylic acid or mixture thereof having from about eight to about twenty-four carbon atoms, of which a major proportion is fatty acid having from about sixteen to about eighteen carbon atoms, the lubricant and polyvalent metal salt together having a strong tendency to form bloom, and a naturally occurring unsaturated fatty acid or polyvalent metal salt thereof having from about eight to about twenty-four carbon atoms in an amount to inhibit the formation of bloom when in the presence of the resin, and bring the iodine value to within the range from about 2.5 to about 20.

---

A polyvinyl chloride resin composition is also provided, consisting essentially of a polyvinyl chloride resin and such stabilizers and lubricants.

A process is provided for inhibiting or eliminating a tendency of a polyvinyl chloride resin composition containing fatty acid or ester lubricant and polyvalent metal salt stabilizers to form bloom, by adding an unsaturated fatty acid to the composition in an amount to inhibit the formation of bloom due to the presence of such mixture, and bring the iodine value of the mixture to at least 2.5.

This invention relates to polyvinyl chloride resin compositions which have substantially no tendency to form bloom, comprising a polyvinyl chloride resin a fatty acid or fatty acid ester lubricant, and a polyvalent metal salt of a saturated, aliphatic fatty acid in combination with an unsaturated fatty acid or polyvalent metal salt thereof in an amount to bring the iodine value of the mixture to within the range from about 2.5 to about 20, and to stabilizer-lubricant compositions for polyvinyl chloride resins comprising the same, and to a process of inhibiting the formation of bloom in polyvinyl chloride resins comprising a polyvinyl chloride resin a fatty acid or fatty acid ester lubricant and a polyvalent metal salt of a saturated aliphatic fatty acid by adding an unsaturated fatty acid or polyvalent metal salt thereof.

It has become possible in recent years to formulate polyvinyl chloride resin compositions which are safe for use in food packaging and which have a remarkable heat stability at elevated temperatures. As the stabilizer systems, calcium and zinc salt combinations have been provided, composed of a member of the group consisting of calcium and zinc benzoates, a member of the group consisting of calcium and zinc salts of the mixed fatty acids derived from edible fats and oils, and sorbitol (U.S. Patent No. 3,004,000, patented Oct. 10, 1961); combinations of the calcium and zinc salts of the mixed fatty acids derived from edible fats and oils, and sorbitol (U.S. Patent No. 3,003,999, patented Oct. 10, 1961); combinations of calcium benzoate and zinc salts of the mixed fatty acids derived from edible fats and oils, and glycerol (U.S. Patent No. 3,003,998 patented Oct. 10, 1961); and combinations of magnesium and zinc salts of benzoic acid and/or fatty acids derived from edible fats and oils, and a nontoxic polyhydric alcohol (British Patent No. 985,685, published Mar. 10, 1965). Such mixed fatty acids can be derived from tallow, lard, sardine oil, olive oil, coconut oil, cottonseed oil, soy bean oil, corn oil and peanut oil, and these oils can be hydrogenated, if desired.

Prior to the grant of these patents, which are based on the use of mixtures of naturally occurring fatty acids derived from edible fats and oils, it was known that combinations of a polyvalent metal stearate and a polyol could be used for the stabilization of polyvinyl chloride resins. Combinations of zinc stearate or calcium stearate and a polyol are disclosed in U.S. Patent No. 2,711,401 to Robert E. Lally, patented June 21, 1955. This patent also discloses combinations of zinc stearate or magnesium stearate and a polyol.

These patents have in common the use of a combination of a polyvalent metal salt or salts of an organic acid and a polyol. No lubricants are present. Such combinations show no noticeable tendency to form bloom in most situations.

The formation of bloom is a problem of long standing in the polyvinyl chloride resin art. It is created by exudation and migration to the surface of the resin of one or more incompatible components of the resin composition. It is a condition that arises under peculiar and often unpredictable conditions, and is frequently erratic, in that a given composition sometimes will develop bloom and sometimes will not. It is particularly likely to be encountered with resin compositions containing lubricants such as relatively long chain saturated fatty acids and fatty acid esters, of which stearic acid and higher fatty acids and esters are especially notorious offenders. Polyvalent metal stearates and other long chain fatty acid salts also can display a strong tendency towards bloom formation, at relatively low salt concentrations, and in the presence of free fatty acids or esters, in certain proportions. Plasticized compositions are quite susceptible. Mixtures of polyvalent metal stearates such as mixtures of calcium and zinc stearates in a 1:1 ratio, as described in the Cousins Patent No. 2,446,976, dated Aug. 19, 1948, also produce bloom in combination with such lubricants.

Blooming is quite objectionable, particularly when the polyvinyl chloride resin composition is employed as a transparent film for food packaging, because bloom obscures the transparency of the package, and furthermore gives the impression to the purchaser that the contents of the package in some way have deteriorated and become unacceptable. Consequently, the art has had recourse to compositions that show no tendency to develop bloom under any conditions that may be encountered.

In the case of the polyol-containing polyvalent metal fatty acid salt combinations in the patents previously referred to, bloom is not normally observed. This may be due to the presence of the polyol which may serve as a solubilizer for the salts, and prevent blooming. However, it is not always desirable or possible to use a polyol. Therefore, this is not the complete answer to the blooming problem when a lubricant is present. Bloom may indeed preclude the use of fatty acid or fatty acid ester lubricants and polyvalent metal stearates in this type of formulation. This is unfortunate, because there are readily available, and among the least expensive of the lubricants and polyvalent metal salt stabilizers that can be used.

In accordance with the invention, it has been determined that if a small proportion of an unsaturated fatty acid, or polyvalent metal salt of such acid, is included with saturated fatty acid or fatty acid ester lubricants, and/or polyvalent metal salts of such acids, in an amount sufficient to bring the iodine value of the fatty acids present, as salts, esters, or free acid, to at least about 2.5, and preferably from about 3 to about 20, a previous tendency to bloom can be more or less completely inhibited. The invention accordingly comprises the combination with a saturated fatty acid or fatty acid ester lubricant having from about eight to about thirty-two carbon atoms, and/or with a polyvalent metal salt of such acid, having a tendency to form bloom, of an unsaturated fatty acid or polyvalent metal salt of such acid in an mount to inhibit the formation of bloom due to the presence of such mixture, and bring the iodine value of the mixture to at least 2.5, and preferably from about 3 to about 20.

The invention thus effects the conversion or upgrading of bloom-forming saturated fatty acid or ester lubricants and polyvalent metal salt stabilizers for polyvinyl chloride resins into compositions having substantially no tendency to form bloom. Accordingly, such compositions that might not previously be used because of the bloom problem can now be made commercially practicable.

The unsaturated acid component of the mixture can be used as the free acid or as a polyvalent metal salt thereof. The polyvalent metal is preferably one of the type normally used for polyvinyl chloride resins.

Any naturally-occurring unsaturated monocarboxylic fatty acid having from about eight to about twenty-four carbon atoms, and preferably from sixteen to eighteen carbon atoms, can be used for this purpose. Acids having less than eight carbon atoms are too volatile, and also produce unpleasant odors. Unsaturated fatty acids that can be employed include oleic, linoleic, linolenic, erucic, ricinoleic, gaeoleic, palmitoleic, myristoleic, and lauroleic acids. These can be employed alone or in admixture.

Commercial grades of unsaturated naturally-occurring monocarboxylic fatty acids are available, and are preferred. These include:

| Specifications | Titer, ° C. | Iodine Value (Wijs) | Acid Value |
|---|---|---|---|
| Oleic Acid (Red Oil) | 15-18 | 83-90 | 189-199 |
| Do | 8-11 | 89-93 | 187-197 |
| Oleic Acid | 8-11 | 89-93 | 197-202 |
| Low-titer Oleic Acid | 5 max. | 90-95 | 197-202 |
| White Oleic Acid | 8-11 | 89-93 | 197-202 |
| Low-titer White Oleic Acid | 5 max. | 90-95 | 197-202 |
| LL Oleic Acid [1] | 2-6 | 86-90 | 200-204 |
| Linoleic Acid | 5 max. | 135-145 | 195-201 |
| Do | 5 max. | 140-145 | 195-201 |
| Do | 5 max. | 145-160 | 195-201 |
| Low Poly-unsaturated Oleic Acid | 7.0 | 85.0 | 200-204 |
| 5° C. Max. Titer Crystallized White Oleic | 5.0 | 95.0 | 200-204 |
| 5° C. Max. Titer Crystallized Red Oil | 5.0 | 95.0 | 199-204 |
| 8-11° C. Titer Crystallized Red Oil | 8.0-11.0 | 95.0 | 199-204 |
| Distilled Palm Type | 43.0-47.0 | 45.0-55.0 | 203-211 |
| Distilled Animal Acid | 40.0-44.0 | 50.0-60.0 | 201-206 |
| Crystallized Distilled Cottonseed-Super Alkyd Grade | 5.0 | 138-145 | 195-200 |

[1] LL (Low Linoleic Content) Oleic: Polyunsaturates 5% max.

The unsaturated acid or polyvalent metal salt thereof should have a high iodine value, so that only as small amounts as possible need be incorporated with the lubricant acid or ester and/or polyvalent metal salt thereof. Hence the iodine value of the acid or salt should be at least about 50, and preferably at least about 80. Unsaturation in fatty acids, esters, or salts thereof, is generally not desirable in polyvinyl chloride resin compositions, because of stability problems, and a tendency towards development of discoloration on the part of the unsaturated adjunct. Hence, the naturally-occurring unsaturated acid mixtures have been avoided as polyvinyl chloride resin adjuncts. However, in accordance with the invention, it has been determined that the small amount of saturation needed to overcome a tendency to bloom is nondeleterious.

The unsaturated fatty acid or polyvalent metal salt thereof can overcome a previously evidenced tendency to bloom of any type of saturated naturally-occurring fatty acid or fatty acid ester lubricant, and polyvalent metal salt of such acid. The problem is found with fatty acids, esters or salts of naturally-occurring saturated aliphatic monocarboxy fatty acids having from about eight to about twenty-four carbon atoms, of which a major proportion is fatty acids having from about sixteen to eighteen carbon atoms. Exemplary saturated acids are lauric acid, myristic acid, palmitic acid, margaric acid, stearic acid, capric acid, and caprylic acid, and mixtures thereof. By "saturated" is meant an acid having an iodine value of less than 1.

Exemplary commercial saturated ftty acid mixtures that can be used in accordance with the invention as lubricants and in the manufacture of polyvalent metal salt stabilizers are:

| Specifications | Titer, ° C. | Iodine value (Wijs) | Acid value |
|---|---|---|---|
| Stearic Acid [5] | 55-55.5 | 0.5 max. | 205-210 |
| Palmitic Acid 70 [1] | 53.3-55.5 | 2 max. | 209-214 |
| Palmitic Acid 80 [3] | 55.7-57.2 | 1 max. | 212-216 |
| Palmitic Acid 90 | 58-61 | 0.5 max. | 217-220 |
| Stearic Acid 80 [2,5] | 64-65 | 1 max. | 197-202 |
| Stearic Acid 90 | 65-67 | 0.5 max. | 198-200 |
| Stearic Acid 95 | 67-69 | 0.5 max. | 197-199 |
| Hydrogenated Tallow Fatty Acid | 57-60 | 2 max. | 200-206 |
| Do | 59.5-61.5 | 1 max. | 200-206 |
| Hydrogenated Fatty Acid | 53.9-55 | 1 max. | 207-213 |
| Commercially pure Palmitic | 58.5-61.0 | 1.0 | 216-220 |
| Eutectic Palmitic-Stearic | 53.0-55.0 | 1.0 | 211-213 |
| Commercially pure Stearic | 65.5-68.0 | 1.0 | 195-200 |
| Special C.P. Stearic | 65.5 | 0.5 | 195-200 |
| Triple Pressed Stearic | 55.0-56.0 | 0.5 | 208-211 |
| Hydrogenated Tallow Acid | 57.0-60.0 | 1.0 | 201-206 |
| Stearic-Palmitic | 60.0-64.0 | 1.0 | 198-205 |

[1] 67% minimum Palmitic content.
[2] 80% minimum Stearic content. For Powder, Titer is 63-65° C.
[3] 78% minimum Palmitic content.
[5] Powdered Grades Sieve Test: 99.5% min. through No. 30; U.S. Standard Sieve: 98% min. through No. 100.

Such fatty acids and the naturally-occurring oils and fatty esters are well known lubricants for polyvinyl chloride resins. Stearic acid, palmitic acid, myristic acid, hydrogenated tallow fatty acids, and montan wax fatty acids and their esters, are typical lubricants.

It will be evident that fatty acid mixtures derived from naturally-occurring fats and oils can of course be used, as such, if the iodine value is appropriate, as the mixed unsaturated-saturated fatty acid or ester lubricant, and/or polyvalent metal salt thereof. If the iodine value is too high, the acids can be blended with saturated fatty acid or fatty acid ester or salt thereof to bring it to within the range from about 2.5 to about 20, as indicated. If it is too low, it can be blended with unsaturated fatty acid or salt. Suitable naturally-occurring fatty acid mixtures are those derived from babassu oil, butter fat, Chinese tallow, coconut oil, ouri oil, palm kernel oil, mutton tallow, beef tallow, and ucuhuba oil. Commercially available mixtures include:

| Specifications | Titer, ° C. | Iodine value (Wijs) | Acid value |
|---|---|---|---|
| Stearic Acid | 52.8-53.3 | 9-15 | 203-209 |
| Stearic Acid [5] | 54-54.7 | 5-7 | 205-210 |
| Hydrogenated Fatty Acid | 52 min. | 7-10 | 193-209 |
| Hydrogenated Tallow Fatty Acid | 53.5-54.5 | 3-9 | 197-209 |
| Do | 56.1-60 | 4-7 | 195-205 |
| Hydrogenated Fish Fatty Acid | 51-54 | 10 max. | 191-199 |
| Do | 54-56 | 3 max. | 193-199 |
| Hydrogenated Fatty Acid | 61.7-65 | 4 max. | 195-201 |
| Hydrogenated Tallow Glyceride | [1] 58-60 | 5 max. | 190-195 |
| Hydrogenated Fish Oil Glyceride | [1] 51-54 | 5 max. | 187-191 |
| Single Pressed Stearic | 53.3-54.2 | 5.0-10.0 | 207-210 |
| Double Pressed Stearic | 54.0-54.6 | 4.5-7.0 | 208-211 |
| Hydrogenated Tallow Acid | 56.0-59.0 | 6.0 | 202-207 |
| Rubber Grade Stearic | 55.0-62.0 | 9.0 | 195-208 |

[1] Titers determined on fatty acids.
[5] Powdered Grades Sieve Test: 99.5% min. through No. 30; U.S. Standard Sieve: 98% min. through No. 100, Any polyvalent metal salt or mixed polyvalent metal salts of this fatty acid mixture can be used. For non-toxic food packaging applications, the polyvalent metal or metals of course are non-toxic. For this purpose, calcium, zinc, tin, and magnesium are preferred polyvalent metals. If toxicity is not a factor, other polyvalent metals can be employed, such as barium, cadmium, lead, and strontium, as well as organotin. Blends of polyvalent metals are customarily used, and are preferred, particularly blends of calcium and zinc, or of magnesium and zinc, in the case of the non-toxic formulations, and of barium and cadmium and of barium, cadmium and zinc, in the case of other formulations.

When both lubricant fatty acid or ester and polyvalent metal saturated fatty acid salt are employed in polyvinyl chloride resins (as is usually the case), the extent of the tendency to form bloom is to a considerable degree influenced by the proportion of lubricant fatty acid or ester to polyvalent metal salt. At high proportions of fatty acid or ester, the tendency is high, and at high proportions of salt the tendency is low. These factors in turn influence the amount of unsaturated fatty acid or salt that is used.

The proportion of unsaturated fatty acid or polyvalent metal salt that is required depends upon the particular saturated fatty acid, ester or salt, the resin, and the proportion thereof in the resin, as well as the iodine value of the unsaturated acid or salt. For each composition, there is a minimum amount of unsaturated acid or salt that must be present before the tendency to form bloom is overcome. This minimum must be determined by trial and error, for a given composition, and is not always reached at the minimum iodine value of the mixture of at least 2.5. However, the remarkable feature of the invention is that for most resin formulations, there is such a minimum; in other words, a tendency to form bloom is overcome by some amount of the unsaturated acid or salt, before the iodine value of 20 is exceeded.

Compositions wherein the acid mixtures have an iodine value within the stated range from about 2.5 to about 20 are easily prepared by simple mixing of the lubricant-polyvalent metal salt mixture with the unsaturated fatty acid or salt. To facilitate uniform blending, the acids and/or esters and/or salts can be melted together, or dissolved in a mutual organic solvent. The solvent need not be removed after the blend has been prepared, but can be employed as a vehicle for the composition, if desired. Alternatively, naturally - occurring unsaturated - saturated fatty acid mixtures such as for example single pressed stearic acid (iodine value 5–10) can be used as a lubricant and/or in the preparation of the polyvalent metal salt stabilizers.

The stabilizer lubricant composition containing polyvalent metal salts of fatty acids in accordance with the invention can be employed with other conventional polyvinyl chloride resin heat stabilizers, the polyvalent metal salt itself serving as a heat-stabilizing component in such formulations. Such heat stabilizers include hindered phenols, organic phosphites, thiodipropionic acids or esters, and epoxy compounds.

The thiodipropionic acids and esters have the formula:

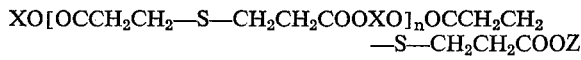

in which $R_1$ is an organic radical selected from the group consisting of hydrogen, and hydrocarbon radicals such as alkyl, alkenyl, aryl, cycloalkyl; mixed alkyl aryl, and mixed alkyl cycloalkyl radicals; hydroxyalkyl and hydroxyalkylene radicals; and esters thereof with aliphatic carboxylic acids; and Y is selected from the group consisting of:

(a) Hydrogen,
(b) A second R radical $R_2$, which can be the same as or different from the $R_1$ radical, (c) A polymeric chain of $n$ thiodipropionic acid ester units:

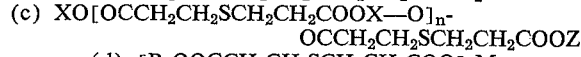

where Z is hydrogen, $R_2$ or M; $n$ is the number of thiodipropionic acid ester units in the chain; and X is hydrogen or a bivalent hydrocarbon group of the type of $R_1$; the value of $n$ can range upwards from O, but there is no upper limit on $n$ except as is governed by the ratio of carbon atoms to sulfur atoms as stated below; and (d) A polyvalent metal M of Group II of the Periodic Table such as zinc, calcium, cadmium, barium, magnesium and strontium.

The molecular weights of the R and Y radicals are taken such that with the remainer of the molecule the thiodipropionic ester has a total of from about ten to about sixty carbon atoms per sulfur atom.

Accordingly, the various thiodipropionic acid ester species coming within the above-designated categories within the general formula can be defined as follows:

(a) $R_1OOCCH_2CH_2SCH_2CH_2COOH$
(b) $R_1OOCCH_2CH_2SCH_2CH_2COOR_2$
(c) $XO[OCCH_2CH_2SCH_2CH_2COOX—O]_{n^-}$
    $OCCH_2CH_2SCH_2CH_2COOZ$
(d) $[R_1OOCCH_2CH_2SCH_2CH_2COO]_2M$

In the above formulae $R_1$ and $R_2$, M, X and Z are the same as before. In the polymer (c), as in the other forms of thiodipropionic acid esters, the total number of carbon atoms per sulfur atom is within the range from about ten to about sixty. The value of $n_1$ can range upwards from 1.

The R radical of these esters is important in furnishing compatibility with the polyvinyl chloride resin. The Y radical is desirably a different radical, $R_2$ or M or a polymer, where R is rather low in molecular weight, so as to compensate for this in obtaining the optimum compatibility and non-volatility. Where Y is a metal, the thiodipropionic acid ester furnishes the beneficial properties of a polyvalent metal salt.

The aryl, alkyl, alkenyl and cycloalkyl groups may, if desired, contain inert nonreactive substituents, such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydroxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl- and aryl-substituted alkylene radicals such as 1,3-propylene,

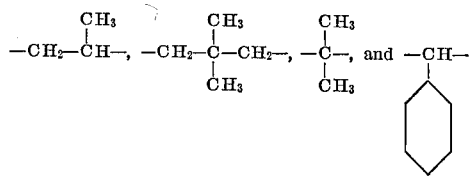

arylene radicals such as phenylene

methylenephenylene

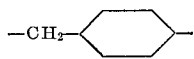

dimethylene phenylene,

and alicyclylene radicals such as cyclohexylene

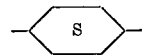

and cyclopentylene

As exemplary of the thiodipropionic acids and esters which can be used, there can be mentioned the following: thiodipropionic acid, monolauryl thiodipropionic acid, dilauryl thiodipropionate, butyl stearyl thiodipropionate, 2-ethylhexyl lauryl thiodipropionate, di-2-ethylhexyl-thiodipropionate, diisodecylthiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soybean oil fatty alcohols and thiodipropionic acid, cyclohexyl nonyl thiodipropionate, monooleyl thiodipropionic acid, hydroxyethyl lauryl thiodipropionate, monoglyceryl thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl) thiodipropionic acid.

These esters are for the most part known compounds but where they are not available, they are readily prepared by esterification of thiodipropionic acid and the corresponding alcohol.

The organic triphosphites contain from one to three groups selected from aryl, alkyl, aryl alkyl, alkaryl, cycloaliphatic, and heterocyclic groups having from one to twenty carbon atoms and from one to three meterocyclic atoms other than nitrogen. These phosphites are acid, that is, they have one or two hydrogens attached through oxygen to the phosphorus, or neutral, that is, all of the valences of the phosphorus atom are taken up with the said groups, which can be monovalent, bivalent or trivalent as desired. Furthermore, these groups may be present in any combination. When bivalent or trivalent, they form heterocyclic rings of the type

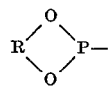

and may also form polymeric phosphites of the type

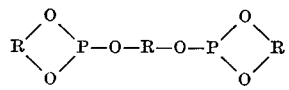

R representing a bivalent group derived from a glycol. Exemplary are triphenyl phosphite, tricresyl phosphite, tri(dimethylphenyl) phosphite, tri-n-butyl phosphite, triisooctyl-phosphite, tridodecyl phosphite, diisooctyl phenyl phosphite, neopentyl glycol phenyl phosphite, propylene glycol isooctyl phosphite, isooctyl diphenyl phosphite, tri(p-t-octylphenyl) phosphite, tri(p-t-nonylphenyl phosphite, tri(p-t-nonyl-o-cresyl) phosphite, diethylene glycol bisbutylene glycol bisphosphite, tribenzyl phosphite, isobutyl dicresyl phosphite, isooctyl di(p-t-octylphenyl) phosphite, tri(2-ethylhexyl) phosphite, tri(2-cyclohexylphenyl) phosphite, tri-α-naphthyl phosphite, trifuryl phosphite, tritetrahydrofurfuryl phosphite, tricyclohexyl phosphite, and tricyclopentyl phosphite.

The hindered phenols which can be employed have the structure

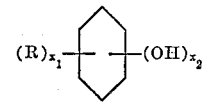

R is an organic radical or radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ is an integer from two to four, $x_2$ is an integer from one to four. The sum of $x_1$ and $x_2$ does not exceed six, and there are R groups at each position ortho to at least one of the OH groups.

Polycyclic phenols include aromatic nuclei which are linked by a bivalent linking radical, and are defined by the formula:

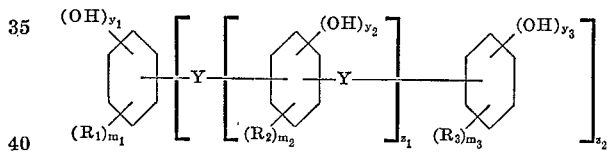

wherein $R_1$, $R_2$ and $R_3$ are inert substituent groups of the type of R above, Y is a bivalent linking radical; $m_1$ is an integer from zero to a maximum of $5-(z_2+y_1)$, $m_2$ can be an integer from zero to three and $m_3$ an integer from zero to four, $z_1$ can be an integer from zero to about six and $z_2$ an integer from zero to five, preferably zero or one. Preferably, the hydroxyl groups in polycyclic phenols are located ortho and/or para to Y. There can be one or more hydroxyl groups per phenyl nucleus, $y_1$, $y_2$ and $y_3$ representing the number thereof. Preferably, there will be only one hydroxyl group per phenyl nucleus. At least one phenolic hydroxyl is hindered, i.e., substituted in both positions ortho to the hydroxyl group.

Y can be a single bond, as in diphenyl, or a bivalent group, such as:

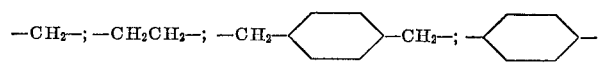

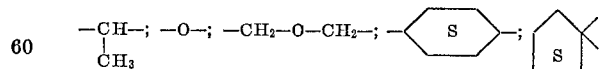

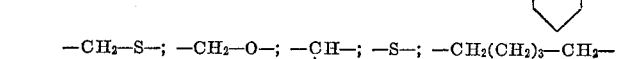

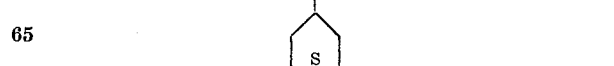

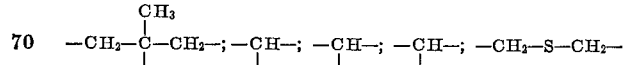

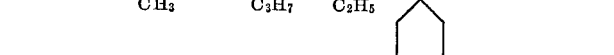

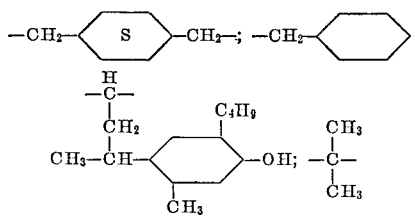
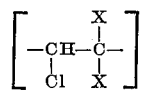

The various Y and R groups are exemplified in the following compounds.

Exemplary of satisfactory monohydric phenols are 2,6-di-tertiary-butyl-4-methyl phenol, 2,6-di-tertiary-butyl-4-methoxy phenol, 2,6-di-nonyl phenol, 2,6-didodecyl phenol, 2,6-dinonyl phenol, 2,6-diphenyl phenol, 2,4,5,6-tetradecyl phenol and β-methyl tetrahydro-α-naphthol.

Exemplary polyhydric phenols are 2,6-ditertiary butyl resorcinol, 2,6-diisopropyl phloroglucinol, 4,4′-methylenebis(2,6-ditertiary butyl-m-cresol), 4,4′-methylenebis(2,6-ditertiary butyl phenol), 2,2′-methylenebis(6-tertiary butyl p-cresol), 4,4′-thiobis-(2,6-dimethylphenol), 4,4′-oxobis (2-methyl-6-isopropyl) phenol), 2,2′-thiobis(3-methyl-6-tertiary butyl phenol), 2,2′-oxobis(6-dodecyl phenol), 2,2′-thiobis(4-methyl-6-tertiary butyl phenol), 2,6-diisooctyl resorcinol, 4,4′-n-butylidenebis(2-tertiary-butyl - 6 - methylphenol), 4,4′-benzylidenebis(2-tertiary-butyl - 6-methyl-phenol), 2,2′-methylenebis(4-methyl-6-)1′-methylcyclohexyl)-phenol, 4,4′-cyclohexylidene-bis(2-6-ditertiary butylphenol), and 2,6-bis(2-hydroxy-3′-tertiarybutyl-5′-methylbenzyl-4-methylphenol).

Other effective stabilizers that can be used are the epoxy compounds containing at least one epoxy group.

Any epoxy compound can be used. The compounds can be aliphatic or cycloaliphatic in character, but aromatic and heterocyclic groups can also be present. The compounds have from 10 to 150 carbon atoms. The longer chain aliphatic compounds of 22 carbon atoms and more are also plasticizers. Typical epoxy compounds that are not plasticizers are epoxy carboxylic acids such as epoxy stearic acid, glycidyl ethers of polyhydric alcohols and phenols, such as triglycidyl glycerine, diglycidyl ether of diethylene glycol, glycidyl epoxy stearyl ether, 1,4-bis(2,3 - epoxypropoxy) benzene, 4,4′ - bis(2,3 -. epoxypropoxy) diphenyl ether, 1,8-bis(2,3-epoxypropoxy) cyclohexane, and 1,3-bis(4,5-epoxy pentoxy), 5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2-bis(4-hydroxyphenyl) butane, 4,4′-dihydroxybenzophenone and 1,5-dihydroxy naphthalene with halogen-containing epoxides such as 3-chloro-1,2-epoxybutane, 3-chloro-1,2-epoxyoctane, and epichlorohydrin. Typical epoxy compounds that combine stabilizing with plasticizing action are listed below under plasticizers.

A total of from 0.5 to 10 parts by weight of the stabilizer lubricant can be used for each 100 parts by weight of the resin. More stabilizer lubricant composition can be used, but usually no better result is obtained, and therefore such amounts can be uneconomic or wasteful. A preferred lubricant and heat stabilizer combination comprises from 0.25 to 2% of the lubricant and from 0.25 to 2% polyvalent metal salt mixture having an iodine value between 2.5 and 20.

The invention is applicable to any polyvinyl chloride resin. The term "polyvinyl chloride" as used herein is inclusive of any polymer formed at least in part of the recurring group $$\left[ -CH-\underset{Cl}{\overset{X}{C}}- \right]$$

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides as a class, for example, those disclosed in British Patent No. 893,288, and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene.

The invention is applicable to rigid, semi-rigid and plasticized formulations. Rigid resins contain less than 10% plasticizer, semi-rigids from about 10% to about 15% plasticizer, and plasticized resins from 15% to 50% or more of plasticizer.

For semi-rigids and plasticized formulations, there can be incorporated plasticizers such as dioctyl phthalate, dioctyl sebacate, dioctyl adipate, and tricresyl phosphate.

Particularly useful plasticizers are the epoxy higher esters having from 22 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

The preparation of the polyvinyl chloride resin composition is easily accomplished by conventional procedures. The selected lubricant and metal salt stabilizer combination ordinarily is mixed with the plasticizer, and this then is blended with the polyvinyl chloride resin, using, for instance, plastic mixing rollers, at a temperature at which the mix is fluid and thorough blending facilitated, milling the plasticizer and stabilizer with the resin on a two-roll mill at from 250 to 350° F. for a time sufficient to form a homogeneous sheet, five minutes, usually. After the mass is formed, it is sheeted off in the usual way.

The following examples in the opinion of the inventors represent preferred embodiments of their invention.

Examples 1 to 4

A series of polyvinyl chloride resin compositions was prepared, as set out in Table I, each based on polyvinyl chloride resin homopolymer, blended with plasticizers, stabilizers and lubricant on a two-roll mill up to 375° F. The base formulation was as follows:

Composition: Parts by weight
    Polyvinyl chloride homopolymer (VC–95) _ 100
    Dioctyl adipate _____ 15
    Epoxidized soybean oil (Drapex 6.8) _____ 15
    Stabilizer lubricant system _____ 0.5–1.0

Each sample was then heated at 375° F. in an air oven to determine heat stability. Pressed, polished sheets were prepared, 30 mils in thickness, and stored at room temperature for up to 30 days to observe blooming and reduction in transparency, if any.

The results of the tests are reported in Table II.

TABLE I

| Stabilizer-Lubricant Composition | Iodine Value | A | B | Examples 1 | 2 | 3 | 4 |
|---|---|---|---|---|---|---|---|
| Ca Stearate | <1 | 0.25 | 0.25 | | 0.25 | 0.25 | 0.25 |
| Zn Stearate | <1 | 0.25 | 0.25 | | 0.25 | 0.20 | 0.15 |
| Stearic Acid | <1 | | 0.5 | 0.5 | | 0.5 | 0.5 |
| Ca Stearate Oleate | 6.2 | | | 0.25 | | | |
| Zn Stearate Oleate | 5.8 | | | 0.25 | | | |
| Zn Oleate | 85 | | | | | 0.05 | 0.1 |
| Stearic Acid [1] | 6.5 | | | | 0.5 | | |
| Iodine Value of Composition | | <1 | <1 | 3.0 | 3.25 | 4.25 | 8.5 |
| Blooming | | N.B. | B. | N.B. | N.B. | N.B. | N.B. |

[1] Single pressed stearic acid having an iodine value of 6.5.

TABLE II

| | Examples | | | | | |
|---|---|---|---|---|---|---|
| | A | B | 1 | 2 | 3 | 4 |
| Time in minutes at 375° F.: | | | | | | |
| 0 | Clear colorless | Clear colorless | Clear colorless | Clear colorless | Clear colorless | Clear colorless. |
| 15 | Light yellow | Light yellow | Light yellow | Light yellow | Light yellow | Light yellow. |
| 30 | Yellow | Yellow | Yellow | Yellow | Yellow | Yellow. |
| 45 | do | do | do | do | do | Do. |
| 60 | Medium yellow / Dark yellow | Medium yellow / Dark yellow | Medium yellow / Dark yellow | Medium yellow / Dark yellow | Medium yellow / Dark yellow | Medium yellow / Dark yellow. |
| 75 | Black edges | Black edges | Black edges | Black edges | Black edges | Black edges. |
| 90 | Black | Black | Black | Black | Black | Black. |

It is evident from the above data that the unsaturated fatty acid component does not in any way influence the heat stability of these compositions but it does eliminate the tendency to bloom a saturated fatty acid—polyvalent metal fatty acid salt lubricant system (Control B).

Control A shows that there is no bloom in the absence of the stearic acid lubricant. Control B, with stearic acid, bloomed.

When the amount of unsaturated acid is high enough to increase iodine value of the fatty acid mixtures to above 2.5, bloom is prevented. (Examples 1, 2, 3, and 4.) The unsaturated acid can be present as free acid (Example 2) or as polyvalent metal salt thereof (Examples 1, 3 and 4).

Examples 5 and 6

Five polyvinyl chloride resin compositions were prepared, to the same polyvinyl chloride resin homopolymer base formulation of Examples 1 to 4. The stabilizer and lubricant components are noted in Table III.

The data show that changing the ratio of metal salt to lubricant does not necessarily overcome the tendency towards development of bloom. However, adding unsaturated fatty acid at either ratio so as to increase the iodine value to above 2.5 eliminates the tendency towards the development of bloom (Controls C, D, E). In this case, the unsaturated acid component was present as a free oleic acid and as polyvalent metal salt.

Example 7

Two polyvinyl chloride resin compositions were prepared, as set out in Examples 1 to 4, each based on polyvinyl chloride resin homopolymer, blended with plasticizer and with the lubricant components noted in Table IV.

TABLE IV

| | Iodine Value | Examples F | 7 |
|---|---|---|---|
| Stabilizer-Lubricant Composition: | | | |
| Ca Stearate | <1 | 0.25 | |
| Zn Stearate | <1 | 0.25 | |
| Wax E [1] | <1 | 0.5 | 0.5 |
| Ca Stearate Oleate | 6.2 | | 0.25 |
| Zn Stearate Oleate | 5.8 | | 0.25 |
| Iodine Value of Composition | | <1 | 3.0 |
| Blooming | | B. | N.B. |

[1] A dihydroxy alcohol diester of montan wax fatty acids.

The data show that increasing iodine value to 3.0 by addition of unsaturated fatty acid (oleic acid) as the polyvalent salt component overcomes a tendency to bloom of a composition using Wax E as the lubricant.

Example 8

Two polyvinyl chloride resin compositions were prepared, to the following formulation, each based on polyvinyl chloride resin homopolymer, blended with plasti-

TABLE III

| | Iodine Value | Examples C | D | E | 5 | 6 |
|---|---|---|---|---|---|---|
| Stabilizer-Lubricant Composition: | | | | | | |
| Ca Stearate | <1 | 0.125 | | | | |
| Zn Stearate | <1 | 0.125 | | | | |
| Stearic Acid | <1 | 0.5 | 0.5 | 0.75 | | |
| Ca Stearate Oleate | 6.2 | | 0.125 | 0.25 | 0.125 | 0.25 |
| Zn Stearate Oleate | 5.8 | | 0.125 | 0.25 | 0.125 | 0.25 |
| Zn Oleate | 85 | | | | | |
| Stearic Acid [1] | 6.5 | | | | 0.50 | 0.75 |
| Iodine Value of Composition | | <1 | 1.99 | 2.38 | 6.3 | 6.3 |
| Blooming | | B. | B. | B. | N.B. | N.B. |

[1] Single pressed stearic acid having an iodine value of 6.5.

cizer and with the stabilizers noted in Table V on a two-roll mill up to 375° F.

Composition: Parts by weight
    Polyvinyl chloride resin homopolymer (Diamond 450) _____ 100
    Dioctyl adipate _____ 15
    Epoxidized soybean oil (Drapex 6.8) _____ 15
    Stabilizer lubricant system noted in Table V ___ 1.0

Each sample was then heated at 375° F. in an air oven to determine heat stability. Pressed polished sheets were prepared 30 mils in thickness, and stored at room temperature for six days to observe blooming and reduction in transparency, if any.

The results of the tests are reported in Table V.

TABLE V

Control G:
    Calcium stearate, 0.25
    Zinc stearate, 0.25
    Stearic acid, 0.5
Example 8:
    Calcium salt of stearic acid containing oleic acid, 0.25
    Zinc salt of stearic acid containing oleic acid, 0.25
    Stearic acid, 0.5

| | Iodine Value | |
|---|---|---|
| | <1 | 3.0 |
| Time (minutes): | | |
| 0 | Clear and colorless | Clear and colorless. |
| 15 | Light yellow | Light yellow. |
| 30 | Yellow | Yellow. |
| 45 | Medium yellow | Medium yellow. |
| 60 | Dark yellow with black edges | Dark yellow with black edges. |
| 75 | Black | Black. |
| 90 | ___do___ | Do. |
| Bloom, after 6 days | Bloom | No bloom. |

It is evident from the above data that the oleic acid in the composition helped to overcome the tendency of Control G to bloom, while not affecting heat stability deleteriously.

Example 9

Two plasticized polyvinyl chloride resin compositions were prepared, each based on polyvinyl chloride resin homopolymer, blended with plasticizer and with the stabilizers noted in Table VI on a two-roll mill up to 375° F.

Composition: Parts by weight
    Polyvinyl chloride resin homopolymer (VC–95) _____ 100
    Dioctyl phthalate _____ 35
    Epoxidized soybean oil (Drapex 6.8) _____ 10
    Stabilizer lubricant system set out in Table VI __ 1.0

Each sample was then heated at 375° F. in an air oven to determine heat stability. Pressed, polished sheets were prepared, 30 mils in thickness, and stored at room temperature for up to six days, to observe blooming and reduction in transparency, if any.

The results of the tests are reported in Table VI.

TABLE VI

Control H:
    Calcium stearate, 0.25
    Zinc stearate, 0.25
    Stearic acid, 0.5
Example 9:
    Calcium stearate-oleate, 0.25
    Zinc stearate-oleate, 0.25
    Stearic acid, 0.5

| | Iodine Value | |
|---|---|---|
| | <1 | 3.0 |
| Time (minutes): | | |
| 0 | Clear and colorless | Clear and colorless. |
| 15 | Light yellow | Light yellow. |
| 30 | Yellow | Yellow. |
| 45 | Medium yellow | Medium yellow. |
| 60 | Dark yellow with black edges | Dark yellow with black edges. |
| 75 | Black | Black. |
| 90 | ___do___ | Do. |
| Bloom, after 5 days | Bloom | No bloom. |

It is evident from the above data that even at a higher plasticizer proportion, the oleic acid in an amount to give an iodine value of 3.0 helped to overcome the tendency to bloom of Control H, while not affecting heat stability deleteriously.

Example 10

Two polyvinyl chloride resin compositions were prepared, each based on polyvinyl chloride resin homopolymer, blended with a plasticizer and with the lubricants noted in Table VII on a two-roll mill up to 375° F. Each sample was then heated at 375° F. in an air oven to determine heat stability. Pressed, polished sheets were prepared 30 mils in thickness, and stored at room temperature for one day to observe blooming and reduction in transparency, if any.

TABLE VII

| | Parts by Weight | |
|---|---|---|
| Composition | Control J | Example 10 |
| Polyvinyl chloride resin homopolymer (VC-95) | 100 | 100 |
| Dioctyl adipate | 15 | 15 |
| Epoxidized soybean oil (Drapex 6.8) | 15 | 15 |
| Stabilizer-lubricant system | 1.0 | 1.0 |
| Ba stearate | 0.25 | |
| Zn stearate | 0.25 | |
| Stearate acid | 0.5 | 0.5 |
| Ba stearate-oleate [1] | | 0.25 |
| Zn stearate-oleate [1] | | 0.25 |
| Iodine value | <1 | 3.8 |
| Bloom | B. | N.B. |

[1] Made from stearate acid containing oleic acid, having an iodine value of 9.0.

It is evident that the oleic acid overcame the blooming tendency of the Control J formulation. Heat stability was unaffected by the oleic acid.

Example 11

Six polyvinyl chloride resin compositions were prepared, each based on polyvinyl chloride resin homopolymer, blended with plasticizer and with lubricants noted in Table VIII on a two-roll mill up to 375° F.

Composition: Parts by weight
- Polyvinyl chloride homopolymer (VC–95) _____ 100
- Dioctyl adipate _____ 15
- Epoxidized soybean oil (Drapex 6.8) _____ 15
- Stabilizer lubricant set out in Table VIII __ 1.0 to 1.25

Each sample was then heated at 375° F. in an air oven to determine heat stability. Pressed, polished sheets were prepared, 30 mils in thickness, and stored at room temperature for six days to observe blooming and reduction in transparency, if any.

The results of the tests are reported in Table VIII.

TABLE VIII

Control K:
  Barium stearate, 0.25
  Cadmium stearate, 0.15
  Zinc stearate, 0.10
  Stearic acid, 0.5
Example 11:
  Barium salt of stearic acid containing oleic acid [1], 0.25
  Cadium salt of stearic acid containing oleic acid [1], 0.15
  Zinc salt of stearic acid containing oleic acid [1], 0.10
  Stearic acid, 0.5

| | Iodine Value | |
|---|---|---|
| | <1 | 8.0 |
| Time (minutes): | | |
| 0 | Clear and colorless | Clear and colorless. |
| 15 | Light yellow | Light yellow. |
| 30 | Yellow | Yellow. |
| 45 | Medium yellow | Medium yellow. |
| 60 | Dark yellow with black edges | Dark yellow with black edges. |
| 75 | Black | Black. |
| 90 | do | Do. |
| Bloom, after 6 days | Bloom | No bloom. |

[1] Mixed stearic-oleic acids.

The oleic acid overcame the tendency to bloom of a barium-cadmium-zinc stearate-stearic acid system. Heat stability was not deleteriously affected by this small amount of oleic acid.

Example 12

Two polyvinyl chloride resin compositions were prepared, each based on polyvinyl chloride resin homopolymer, blended with plasticizer and with the stabilizers noted in Table IX on a two-roll mill up to 375° F.

Composition Parts by weight
- Polyvinyl chloride resin homopolymer (Diamond 450) _____ 100
- Dioctyl adipate _____ 15
- Epoxidized soybean oil (Drapex 6.8) _____ 15
- Stabilizer-lubricant system noted in Table IX __ 1.0

Each sample was then heated at 375° F. in an air oven to determine heat stability. Pressed, polished sheets were prepared, 30 mils in thickness, and stored at room temperature for six days to observe blooming and reduction in transparency, if any.

The results of the tests are reported in Table IX.

TABLE IX

Control K:
  Magnesium stearate, 0.25
  Zinc stearate, 0.25
  Wax E, 0.5
Example 12:
  Magnesium salt of stearic acid containing oleic acid, 0.25
  Zinc salt of stearic acid containing oleic acid, 0.25
  Wax E, 0.5

| | Iodine Value | |
|---|---|---|
| | <1 | 6.5 |
| Time (minutes): | | |
| 0 | Clear and colorless | Clear and colorless. |
| 15 | Light yellow | Light yellow. |
| 30 | Yellow | Yellow. |
| 45 | Medium yellow | Medium yellow. |
| 60 | Dark yellow with black edges | Dark yellow with black edges. |
| 75 | Black | Black. |
| 90 | do | Do. |
| Bloom, after 6 days | Bloom | No bloom. |

It is evident from the above data, that the oleic acid in the composition of Example 12, having an iodine value of 6.5, overcame the tendency of Control K to bloom, while not affecting heat stability deleteriously.

Having regard to the foregoing disclosure, the following is claimed as the inventive and patentable embodiments thereof:

1. A polyvinyl chloride resin stabilizer lubricant composition consisting essentially of a fatty acid or fatty acid ester lubricant and a polyvalent metal salt of a naturally-occurring saturated aliphatic fatty monocarboxylic acid having from about eight to about twenty-four carbon atoms of which at least a major proportion is fatty acid having from about sixteen to about eighteen carbon atoms, the mixture of the fatty acid or ester and the polyvalent metal salt having a strong tendency to form bloom in the presence of a polyvinyl chloride resin, and a naturally-occurring unsaturated fatty acid or polyvalent metal salt thereof having from about eight to about twenty-four carbon atoms in an amount to inhibit the formation of bloom due to the presence of such mixture, and bring the iodine value of the mixture to within the range from about 2.5 to about 20.

2. A polyvinyl chloride resin lubricant composition in accordance with claim 1, wherein the polyvalent metal salt is a stearate.

3. A polyvinyl chloride resin lubricant composition in accordance with claim 1, including a mixture of polyvalent metal salts.

4. A polyvinyl chloride resin lubricant composition in accordance with claim 3, wherein the polyvalent metal salts are calcium and zinc salts.

5. A polyvinyl chloride resin lubricant composition in accordance with claim 1 including an additional polyvinyl chloride resin heat stabilizer selected from the group consisting of thiodipropionic acids and esters thereof, organic phosphates, hindered phenols, and epoxy compounds.

6. A polyvinyl chloride resin lubricant composition in accordance with claim 1 in which the lubricant is stearic acid.

7. A polyvinyl chloride resin lubricant composition in accordance with claim 1 in which the lubricant is a montan wax fatty acid ester.

8. A polyvinyl chloride resin lubricant composition in accordance with claim 1 in which the unsaturated-saturated fatty acid mixture is a naturally-occurring fatty acid mixture having an iodine value within the range from 5 to 20, and an acid value below 225.

9. A polyvinyl chloride resin composition consisting essentially of a polyvinyl chloride resin, a lubricating amount of a fatty acid or fatty acid ester lubricant and a stabilizing amount of a polyvalent metal salt of a naturally-occurring saturated fatty monocarboxylic acid having from about eight to about twenty-four carbon atoms, of which at least a major proportion is fatty acid having from about sixteen to about eighteen carbon atoms, the mixture of the fatty acid salt and lubricant having a strong tendency to form bloom, and a naturally-occurring unsaturated fatty acid or polyvalent metal salt thereof having from about eight to about twenty-four carbon atoms in an amount to inhibit the formation of bloom due to the presence of such mixture, and bring the iodine value of the fatty acid mixture to at least 2.5.

10. A polyvinyl chloride resin composition in accordance with claim 9 comprising polyvinyl chloride resin plasticizer in an amount of from about 10 to about 50% by weight.

11. A polyvinyl chloride resin composition in accordance with claim 10 wherein the plasticizer comprises an epoxidized fatty acid ester.

12. A polyvinyl chloride resin composition in accordance with claim 11 wherein the epoxidized fatty acid ester is epoxidized soybean oil.

13. A polyvinyl chloride resin composition in accordance with claim 9 wherein the stabilizer lubricant comprises a saturated fatty acid and mixed polyvalent metal salts of mixed saturated and unsaturated fatty acids.

14. A polyvinyl chloride resin composition in accordance with claim 9 wherein the stabilizer lubricant comprises a saturated-unsaturated fatty acid mixture and mixed polyvalent metal salts of mixed saturated fatty acids.

15. A polyvinyl chloride resin composition in accordance with claim 9 wherein the stabilizer lubricant comprises a saturated-unsaturated fatty acid mixture and mixed polyvalent metal salts of mixed saturated and unsaturated fatty acids.

16. A polyvinyl chloride resin composition in accordance with claim 9 wherein the saturated fatty acid component of the acid, ester or salt comprises stearic acid and the unsaturated fatty acid component of the acid, ester or salt comprises oleic acid.

17. A polyvinyl chloride resin lubricant composition in accordance with claim 1 wherein the polyvalent metal salt is nontoxic and is selected from the group consisting of calcium, zinc, tin and magnesium.

18. A polyvinyl chloride resin lubricant composition in accordance with claim 17, including a mixture of such nontoxic polyvalent metal salts.

19. A polyvinyl chloride resin composition in accordance with claim 9 wherein the polyvalent metal salt is nontoxic and is selected from the group consisting of calcium, magnesium, zinc and tin.

20. A polyvinyl chloride resin composition in accordance with claim 19, including a mixture of such nontoxic polyvalent metal salts.

References Cited

UNITED STATES PATENTS

| | | | |
|---|---|---|---|
| 3,003,999 | 10/1961 | Kauder et al. | 260—45.75 |
| 3,223,660 | 12/1965 | Pulver et al. | 260—23 |
| 3,377,304 | 4/1968 | Kuester et al. | 260—23 |

OTHER REFERENCES

Noller, "Chemistry of Organic Compounds," 1957, 2nd edition, p. 181.

DONALD E. CZAJA, Primary Examiner

R. A. WHITE, Assistant Examiner

U.S. Cl. X.R.

252—400; 260—45.7, 45.8, 45.85, 45.95

UNITED STATES PATENT OFFICE
CERTIFICATE OF CORRECTION

Patent No. 3,479,309        Dated November 18, 1969

Inventor(s) Arthur C. Hecker et al.

It is certified that error appears in the above-identified patent and that said Letters Patent are hereby corrected as shown below:

Column 1, line 30, the line (─────) should be moved so as to follow the Abstract which ends at line 41; and lines 32-41, should follow line 29, so that the Abstract is not divided; Column 3, line 7, "mount" should read -- amount --; line 30, "gaeoleic" should read -- gadoleic --. Column 4, line 4, "ftty" should read -- fatty --. Column 16, line 53, "phosphates" should read -- phosphites --.

Signed and sealed this 25th day of August 1970.

(SEAL)
Attest:

EDWARD M. FLETCHER, JR.
Attesting Officer

WILLIAM E. SCHUYLER, JR.
Commissioner of Patents